United States Patent
Hsieh

(10) Patent No.: US 8,431,898 B2
(45) Date of Patent: Apr. 30, 2013

(54) INFRARED CUT FILTER REMOVABLE MODULE CONTROL APPARATUS

(75) Inventor: Ming-Chih Hsieh, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 338 days.

(21) Appl. No.: 12/872,667

(22) Filed: Aug. 31, 2010

(65) Prior Publication Data

US 2012/0044566 A1  Feb. 23, 2012

(30) Foreign Application Priority Data

Aug. 18, 2010 (TW) ................................ 99127511 A

(51) Int. Cl.
*G02F 1/01* (2006.01)
(52) U.S. Cl.
USPC .......................................... 250/330; 250/331
(58) Field of Classification Search .......... 250/330–334; 359/350–361
See application file for complete search history.

(56) References Cited

U.S. PATENT DOCUMENTS

| 6,365,989 B1 * | 4/2002 | O'Donnell | 307/42 |
| 2006/0158039 A1 * | 7/2006 | Kawamura | 307/112 |
| 2007/0201738 A1 * | 8/2007 | Toda et al. | 382/144 |

* cited by examiner

*Primary Examiner* — Michael G Lee
*Assistant Examiner* — Matthew Mikels
(74) *Attorney, Agent, or Firm* — Altis Law Group, Inc.

(57) ABSTRACT

An infrared cut filter removable (ICR) module control apparatus includes a photoresistor, first to sixth electronic switches, an ICR module, a comparator, and a central processing unit (CPU). A first terminal of the photoresistor is connected to a power supply through a resistor. A second terminal of the photoresistor is grounded, and connected to the second to fourth electronic switches and the CPU through the first electronic switch. The second electronic switch is connected to the fifth and sixth switches. A node between the third and fourth switches is connected to a first input terminal of the ICR module and the non-inverting terminal of the comparator. A node between the fifth and sixth switches is connected to a second input terminal of the ICR module and the inverting terminal of the comparator. The CPU is connected to the output terminal of the comparator and connected to the first electronic switch.

8 Claims, 1 Drawing Sheet

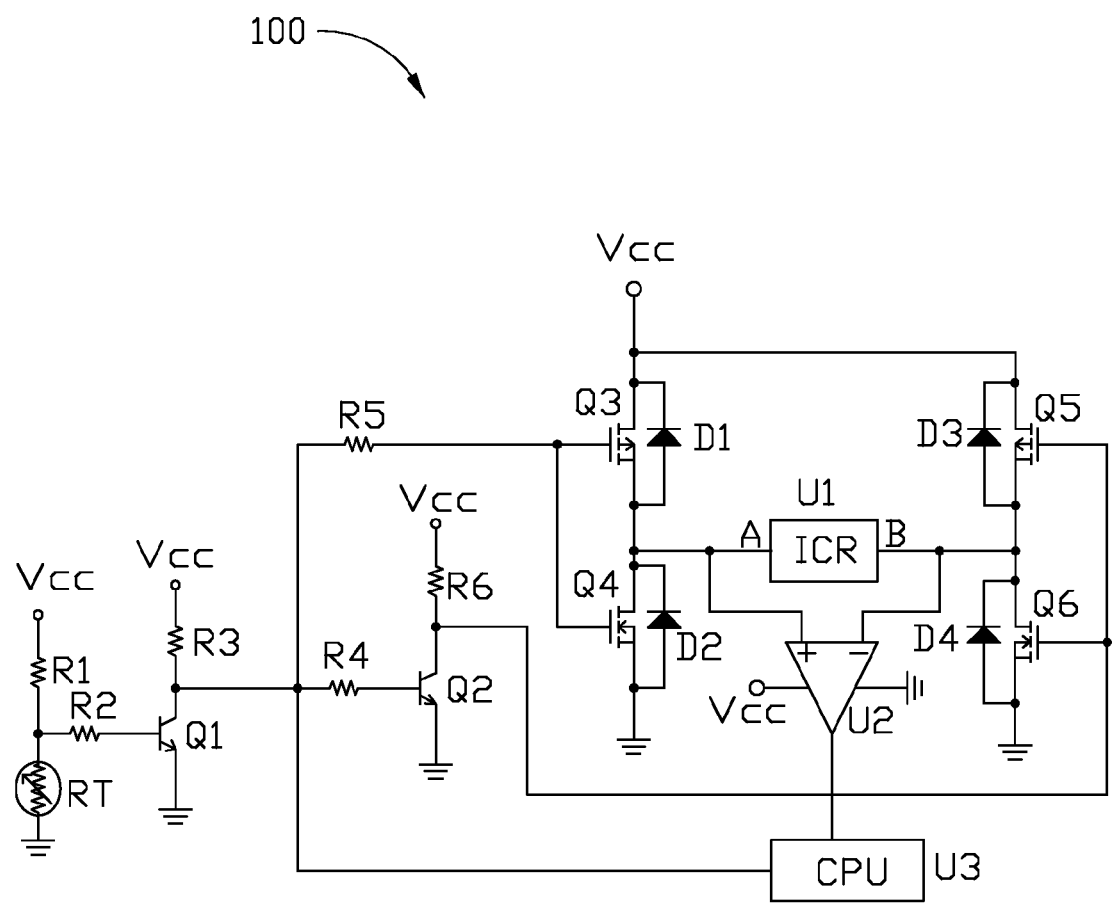

INFRARED CUT FILTER REMOVABLE MODULE CONTROL APPARATUS

BACKGROUND

1. Technical Field

The present disclosure relates to an infrared cut filter removable (ICR) module control apparatus.

2. Description of Related Art

Nowadays, video cameras are used widely, for shooting clear video pictures in the dark, if an infrared light module is installed on the video camera. However, the infrared light module may produce color offset problems. To deal with the color offset problems, ICR modules are installed on sensors of the video cameras. The ICR module includes a normal light filter, an infrared filter, a first input terminal, and a second input terminal. The infrared filter can eliminate color offset. If a voltage at the first input terminal is less than a voltage at the second input terminal, the ICR module is switched to the normal light filter mode. If the voltage at the first input terminal is larger than the voltage at the second input terminal, the ICR module is switched to the infrared filter mode. However, sometimes the ICR module is switched to an incorrect mode, and the operator would not know that, the video pictures may be blurry.

BRIEF DESCRIPTION OF THE DRAWING

Many aspects of the present embodiments can be better understood with reference to the following drawing. The components in the drawing are not necessarily drawn to scale, the emphasis instead being placed upon clearly illustrating the principles of the present embodiments. Moreover, in the drawing, all the views are schematic, and like reference numerals designate corresponding parts throughout the several views.

The FIGURE is a circuit diagram of an embodiment of an infrared cut filter removable module control apparatus.

DETAILED DESCRIPTION

The disclosure, including the accompanying drawing, is illustrated by way of example and not by way of limitation. It should be noted that references to "an" or "one" embodiment in this disclosure are not necessarily to the same embodiment, and such references mean at least one.

Referring to the FIGURE, an embodiment of an infrared cut filter removable (ICR) module control apparatus 100 is used to eliminate color offset of a video camera (the ICR module control apparatus 100 is one part of the video camera, and the other parts of the video camera are not shown). The ICR module control apparatus 100 includes a photoresistor RT, six resistors R1-R6, two npn transistors Q1 and Q2, two p-channel metallic oxide semiconductor (PMOS) transistors Q3 and Q5, two n-channel metallic oxide semiconductor (NMOS) transistors Q4 and Q6, four diodes D1-D4, a power supply Vcc, an ICR module U1, a comparator U2, and a central processing unit (CPU) U3.

In one embodiment, the resistance of the photoresistor RT is reduced if the light luminance is increased, and the resistance of the photoresistor RT is increased if the light luminance is reduced. The ICR module U1 includes a first terminal A and a second input terminal B, if a voltage at the first input terminal A is less than a voltage at the second input terminal B, the ICR module U1 is switched to a normal light filter mode, if the voltage at the first input terminal A is larger than the voltage at the second input terminal B, the ICR module U1 is switched to an infrared filter mode. The CPU U3 is used to process data of the video camera.

A first terminal of the resistor R1 is connected to the power supply Vcc, a second terminal of the resistor R1 is grounded through the photoresistor RT. A node between the resistor R1 and the photoresistor RT is connected to a base of the transistor Q1. An emitter of the transistor Q1 is grounded. A collector of the transistor Q1 is connected to the power supply Vcc through the resistor R3. The collector of the transistor Q1 is also connected to a base of the transistor Q2 through the resistor R4, connected to gates of the transistors Q3 and Q4 through the resistor R5, and connected to the CPU U3. An emitter of the transistor Q2 is grounded. A collector of the transistor Q2 is connected to the power supply Vcc through the resistor R6. The collector of the transistor Q2 is also connected to gates of the transistors Q5 and Q6.

Drains of the transistors Q3 and Q5 are connected to the power supply Vcc. A source of the transistor Q3 is connected to a drain of the transistor Q4. The source of the transistor Q5 is connected to a drain of the transistor Q6. Sources of the transistors Q4 and Q6 are grounded. An anode and a cathode of the diode D1 are respectively connected to the source and the drain of the transistor Q3. An anode and a cathode of the diode D2 are respectively connected to the source and the drain of the transistor Q4. An anode and a cathode of the diode D3 are respectively connected to the source and the drain of the transistor Q5. An anode and a cathode of the diode D4 are respectively connected to the source and drain of the transistor Q6.

The first input terminal A of the ICR module U1 is connected to the source of the transistor Q3 and a non-inverting terminal of the comparator U2. The second input terminal B of the ICR module U1 is connected to the source of the transistor Q5 and an inverting terminal of the comparator U2. A voltage terminal of the comparator U2 is connected to the power supply Vcc, and a ground terminal of the comparator U2 is grounded. An output terminal of the comparator U2 is connected to the CPU U3. In other embodiments, the transistors Q1-Q6 can select other types of electronic switches according to requirements.

In use, when the light luminance is larger than a predetermined value, the resistance of the photoresistor RT is less than a predetermined value. Therefore, the transistor Q1 is turned off, then the CPU U3 receives a high voltage signal, such as 5 volts (V), from the collector of the transistor Q1. The transistor Q2 is turned on, and then the transistors Q4 and Q5 are turned on, the transistors Q3 and Q6 are turned off. The first input terminal A of the ICR module U1 and the non-inverting terminal of the comparator U3 are at a low voltage state, such as 0V. The second input terminal B of the ICR module U1 and the inverting terminal of the comparator U3 are at a high voltage state, such as 5V. Therefore, the ICR module U1 is switched to the normal light filter mode, and the comparator U2 outputs a low voltage signal, such as 0V, to the CPU U3.

When the light luminance is less than a predetermined value, the resistance of the photoresistor RT is larger than a predetermined value. Therefore, the transistor Q1 is turned on, then the CPU U3 receives a low voltage signal, such as 0V, from the collector of the transistor Q1. The transistor Q2 is turned off, and then the transistors Q4 and Q5 are turned off, the transistors Q3 and Q6 are turned on. The first input terminal A of the ICR module U1 and the non-inverting terminal of the comparator U3 are at a high voltage state, such as 5V. The second input terminal B of the ICR module U1 and the inverting terminal of the comparator U3 are at a low voltage state, such as 0V. Therefore, the ICR module U1 is switched to the infrared filter mode, and the comparator U2 outputs a high voltage signal, such as 5V, to the CPU U3.

The CPU U3 receives the voltage signal from the collector of the transistor Q1 and the voltage signal from the output terminal of the comparator U2, and compares the two voltage signals to determine whether the ICR module U1 is switched to a correct mode. Referring to the following table, the CPU U3 can determine the mode according to the table, which is concluded by the above analyze.

| Q1 | U2 | RT | U1 | U3 |
|---|---|---|---|---|
| 0 | 1 | >Rm | infrared filter mode | normal |
| 1 | 0 | <Rm | normal light filter mode | normal |
| 0 | 0 | — | — | abnormal |
| 1 | 1 | — | — | abnormal |

Where, in the table layout, "Q1" stands for the voltage signal from the collector of the transistor Q1, "U2" stands for the voltage signal from the output terminal of the comparator U2, "RT" stands for the resistance of the photoresistor RT, "U1" stands for the mode of the ICR module U1, "U3" stands for the determining results of the CPU U3, "1" stands for the high voltage state, "0" stands for the low voltage state, "Rm" stands for the predetermined value of the photoresistor RT. Therefore, when the ICR module U1 is switched to a wrong mode, the CPU U3 sends warning information to the operator according to the table, which can avoid executing an incorrect mode.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. An infrared cut filter removable (ICR) module control apparatus comprising:
   a power supply;
   a first resistor;
   a photoresistor comprising a first terminal connected to the power supply through the first resistor, and a grounded second terminal;
   a central processing unit (CPU);
   first to sixth electronic switches, wherein a node between the first resistor and the photoresistor is connected to the second to fourth electronic switches and the CPU through the first electronic switch, the second electronic switch is connected to the fifth and sixth electronic switches;
   an ICR module comprising a first input terminal and a second input terminal, wherein the ICR module is switched between a normal light filter mode and an infrared filter mode by changing a voltage difference between the first and second input terminals, a node between the third and fourth electronic switches is connected to the first input terminal, a node between the fifth and sixth electronic switches is connected to the second input terminal; and
   a comparator comprising a non-inverting terminal connected to the first input terminal of the ICR module, an inverting terminal connected to the second input terminal of the ICR module, and an output terminal;
   wherein the CPU is connected to the output terminal of the comparator and the first electronic switch, the first electronic switch is switched by the change of the resistance of the photoresistor, then controls the states of the second to sixth electronic switches to switch the voltage difference between the first and second input terminals of the ICR module, the CPU compares a first signal from the first electronic switch and a second signal from the comparator to determine whether the ICR module is switched to a correct mode; and
   wherein the first and second electronic switches are npn transistors, the third and fifth electronic switches are p-channel metal-oxide semiconductor transistors, the fourth and sixth electronic switches are n-channel metal-oxide semiconductor transistors, the node between the first resistor and the photoresistor is connected to the base of the first electronic switch through a second resistor, the emitter of the first electronic switch is grounded, the collector of the first electronic switch is connected to the power supply through a third resistor, connected to the base of the second electronic switch through a fourth resistor, connected to the gates of the third and fourth electronic switches, and connected to the CPU; the emitter of the second electronic switch is grounded, the collector of the second electronic switch is connected to the power supply through a sixth resistor and connected to the gates of the fifth and sixth electronic switches, the drains of the third and fifth electronic switches are connected to the power supply, the sources of the third and fifth electronic switches are respectively connected to the drains of the fourth and sixth electronic switches, the sources of the fourth and sixth electronic switches are grounded.

2. The ICR module control apparatus of claim 1, wherein the resistance of the photoresistor is reduced in response to ambient light luminance being increased, and the resistance of the photoresistor is increased in response to the ambient light luminance being reduced.

3. The ICR module control apparatus of claim 1, further comprising four diodes respectively connected between the sources and the drains of the third to sixth electronic switches.

4. An infrared cut filter removable (ICR) module control apparatus comprising:
   a power supply;
   a first resistor;
   a photoresistor connected in series with the first resistor between the power supply and ground;
   a central processing unit (CPU);
   first to sixth electronic switches, wherein a node between the first resistor and the photoresistor is connected to a first terminal of the first electronic switch, a second terminal of the first electronic switch is grounded, a third terminal of the first electronic switch is connected to the power supply through a second resistor, and connected to a first terminal of the second electronic switch, and connected to first terminals of the third and fourth electronic switches, a second terminal of the second electronic switch is grounded, a third terminal of the second electronic switch is connected to the power supply through a third resistor, and connected to first terminals of the fifth and sixth electronic switches, second terminals of the fourth and sixth electronic switches are grounded, a third terminal of the fourth electronic switch is connected to a second terminal of the third electronic switch, a third terminal of the sixth electronic switch is connected to a second terminal of the fifth electronic switch, third terminals of the third and fifth electronic switches are connected to the power supply, the third terminal of the first electronic switch is connected to the CPU, wherein the first, second, fourth, and sixth electronic switches are respectively turned on in response to their first terminals being at high level, and respectively turned off in response to their first terminals being at low level, the third and fifth electronic switches are respectively turned on in response to their first terminals being at low level, and respectively turned off in response to their first terminals being at low level;

an ICR module comprising a first input terminal and a second input terminal, wherein the ICR module is switched between a normal light filter mode and an infrared filter mode by changing a voltage difference between the first and second input terminals, the third terminal of the fourth switches is connected to the first input terminal, the third terminal of the sixth switches is connected to the second input terminal;

a comparator comprising a non-inverting terminal connected to the first input terminal of the ICR module, an inverting terminal connected to the second input terminal of the ICR module, and an output terminal; and the CPU connected to the output terminal of the comparator, wherein the first electronic switch is switched by the change of the resistance of the photoresistor, then controls the states of the second to sixth electronic switches to switch the voltage difference between the first and second input terminals of the ICR module, the CPU compares a first signal from the first electronic switch and a second signal from the comparator to determine whether the ICR module is switched to a correct mode.

5. The ICR module control apparatus of claim 4, wherein further comprises a fourth resistors and a fifth resistors, the third terminal of the first electronic switch is connected to the first terminal of the second electronic switch through the fourth resistor, and is connected to the first terminals of the third and fourth electronic switches through the fifth resistor.

6. The ICR module control apparatus of claim 5, wherein the first and second electronic switches are npn transistors, the third and fifth electronic switches are p-channel metal-oxide semiconductor transistors, the fourth and sixth electronic switches are n-channel metal-oxide semiconductor transistors, the first, second, and third terminals of the first and second electronic switches are, respectively, the base, the emitter, and the collector of npn transistors, the first, second, and third terminals of the third and fifth electronic switches are, respectively, the gate, the source, and the drain of p-channel metal-oxide semiconductor transistors, the first, second, and third terminals of the fourth and sixth electronic switches are, respectively, the gate, the source, and the drain of n-channel metal-oxide semiconductor transistors.

7. The ICR module control apparatus of claim 6, wherein the resistance of the photoresistor is reduced in response to ambient light luminance being increased, and the resistance of the photoresistor is increased in response to the ambient light luminance being reduced.

8. The ICR module control apparatus of claim 7, further comprising four diodes respectively connected between the sources and the drains of the third to sixth electronic switches.

* * * * *